(12) United States Patent
He et al.

(10) Patent No.: US 11,455,802 B2
(45) Date of Patent: Sep. 27, 2022

(54) VIDEO FEATURE EXTRACTION METHOD AND DEVICE

(71) Applicant: Beijing Bytedance Network Technology Co., Ltd., Beijing (CN)

(72) Inventors: Yi He, Beijing (CN); Lei Li, Beijing (CN); Cheng Yang, Beijing (CN); Gen Li, Beijing (CN); Yitan Li, Beijing (CN)

(73) Assignee: BEIJING BYTEDANCE NETWORK TECHNOLOGY CO. LTD., Beijing (CN)

( * ) Notice: Subject to any disclaimer, the term of this patent is extended or adjusted under 35 U.S.C. 154(b) by 2 days.

(21) Appl. No.: 16/971,760

(22) PCT Filed: Dec. 29, 2018

(86) PCT No.: PCT/CN2018/125496
§ 371 (c)(1),
(2) Date: Aug. 21, 2020

(87) PCT Pub. No.: WO2019/184520
PCT Pub. Date: Oct. 3, 2019

(65) Prior Publication Data
US 2021/0089785 A1    Mar. 25, 2021

(30) Foreign Application Priority Data

Mar. 29, 2018    (CN) .......................... 201810271774.6

(51) Int. Cl.
*G06V 20/40*        (2022.01)
*G06K 9/62*         (2022.01)

(52) U.S. Cl.
CPC .......... *G06V 20/46* (2022.01); *G06K 9/6269* (2013.01); *G06V 20/41* (2022.01)

(58) Field of Classification Search
CPC ....... G06V 20/46; G06V 20/41; G06K 9/6269
See application file for complete search history.

(56) References Cited

U.S. PATENT DOCUMENTS 10,803,318 B1 * 10/2020 Chen ................... G06K 9/00718
2013/0250115 A1 * 9/2013 Fan .......................... H04N 7/18
                                                        348/150
(Continued)

FOREIGN PATENT DOCUMENTS

CN    105574215 A    5/2016
CN    106295605 A    1/2017
(Continued)

OTHER PUBLICATIONS

International Patent Application No. PCT/CN2018/125496; Int'l Search Report; dated Apr. 4, 2019; 2 pages.
(Continued)

*Primary Examiner* — Santiago Garcia
(74) *Attorney, Agent, or Firm* — BakerHostetler

(57) ABSTRACT

A video feature extraction method and device are provided. The method includes extracting one or more frames from a video object to obtain one or more frames of images; stage-by-stage processing each of the one or more frames of images by multi-typed pooling processes to obtain an image feature of the one or more frames of images; and determining a video feature according to the image feature of the one or more frames of images. The multi-typed pooling processes include a maximum pooling process, a minimum pooling process and an average pooling process.

15 Claims, 8 Drawing Sheets

```
S11: Extracting frames from a video object to obtain frames of images

S12: Processing each of the frames of images by stage-by-stage multi-typed pooling processes to obtain an image feature of the frame of image; the multi-typed pooling processes include a maximum pooling process, a minimum pooling process and an average pooling process S13: Determining a video feature according to image features corresponding to the frames of images
```

(56) References Cited

U.S. PATENT DOCUMENTS

| | | | | |
|---|---|---|---|---|
| 2016/0007058 | A1* | 1/2016 | Wang | G06K 9/00744 |
| | | | | 725/116 |
| 2017/0289617 | A1* | 10/2017 | Song | H04N 21/812 |
| 2017/0289624 | A1* | 10/2017 | Avila | H04L 65/604 |
| 2018/0020243 | A1* | 1/2018 | Ni | G11B 27/031 |
| 2018/0082153 | A1 | 3/2018 | Wan et al. | |
| 2019/0156113 | A1* | 5/2019 | Binsaadoon | G06K 9/00348 |
| 2020/0258616 | A1* | 8/2020 | Likosky | H04N 21/44 |
| 2021/0058667 | A1* | 2/2021 | He | H04N 21/23418 |

FOREIGN PATENT DOCUMENTS

| | | |
|---|---|---|
| CN | 106649663 A | 5/2017 |
| CN | 107092960 A | 8/2017 |
| CN | 107169415 A | 9/2017 |
| CN | 107247949 A | 10/2017 |
| CN | 107491748 A | 12/2017 |
| CN | 107564009 A | 1/2018 |
| CN | 107844766 A | 3/2018 |
| JP | 2015-111339 A | 6/2015 |
| JP | 2017-174039 A | 9/2017 |
| JP | 2018-017570 A | 2/2018 |
| WO | WO 2003/005697 A2 | 1/2003 |

OTHER PUBLICATIONS

Ambat et al.; "Local feature description for keypoint matching"; The Institute of Electronics Information and Communication Engineer; IEICE Technical Report; 2015; p. 53-73 (contains English Abstract).

"Convolutional Neural Networks"; Convolutional Neural Networks, $23^{rd}$ Image Sensing Symposium; Jan. 2017; p. 17 total of 6 pages (contains English Abstract).

Okaya Takayuki; "Deep Learning, Image recognition"; Basic trends, Scientific Operations of Management, Research Laboratories; vol. 60 No. 4; 2015; p. 198-204 (contains English Abstract).

Singapore Patent Application No. 11202008272R; Search Report Written Opinion; dated Jul. 7, 2022; 10 pages.

* cited by examiner

VIDEO FEATURE EXTRACTION METHOD AND DEVICE

CROSS-REFERENCE TO RELATED APPLICATIONS

The disclosure is the national phase application of International Patent Application No. PCT/CN2018/125496, titled "VIDEO FEATURE EXTRACTION METHOD AND DEVICE", filed on Dec. 29, 2018, which claims priority to Chinese Patent Application No. 201810271774.6 filed on Mar. 29, 2018, the entire contents of which are incorporated herein by reference.

TECHNICAL FIELD

The disclosure relates to the technical field of video processing, and more particularly to a video feature extraction method and device.

BACKGROUND

In the current multimedia information society, users upload massive videos to a video platform every day. Most of these videos are normal and valuable videos. However, there are also some defective videos. The defective videos mainly include: videos repeated with existing videos in a video database of the platform, videos repeated with videos in a copyright database (such as videos needing royalties) and some videos not suitable for being displayed or forbidden to be displayed. Therefore, it is necessary to quickly compare and filter the massive videos uploaded by the users. The core technology to improve the speed and accuracy of video comparison is to reasonably extract and compare features of video frames and determine similarities.

In order to improve the speed and accuracy of comparison, it is necessary to generate, for one video, a video feature that can characterize the video, so as to determine the similarity of the videos by comparing the video features of two videos. An extraction method of the video features and the excellence degree of the video features determine the efficiency and accuracy of the video comparison.

SUMMARY

The object of one or more embodiments of the disclosure is to provide a new video feature extraction method and device.

The purpose of one or more embodiments of the disclosure is achieved by the following technical solutions. The video feature extraction method according to one or more embodiments of the disclosure includes the following steps: extracting one or more frames from a video object to obtain one or more frames of images; stage-by-stage processing each of the one or more frames of images by multi-typed pooling processes to obtain an image feature of the one or more frames of images, and determining a video feature according to the image feature of the one or more frames of images. The multi-typed pooling processes include a maximum pooling process, a minimum pooling process and an average pooling process.

The object of the disclosure can also be further achieved by the following technical scheme.

In the foregoing video feature extraction method, stage-by-stage processing each of the one or more frames of images by multi-typed pooling processes includes stage-by-stage processing each of the one or more frames of images by the multi-typed pooling processes based on a plurality of color channels of the one or more frames of images.

In the foregoing video feature extraction method, stage-by-stage processing each of the one or more frames of images by multi-typed pooling processes to obtain an image feature of the one or more frames of images includes determining a matrix according to the one or more frames of images, stage-by-stage generating a smaller matrix by utilizing the multi-typed pooling processes until the matrix is minimized to be a matrix merely containing one point, and determining the image feature according to the matrix merely containing one point.

In the foregoing video feature extraction method, determining a matrix according to the one or more frames of images, stage-by-stage generating a smaller matrix by utilizing the multi-typed pooling processes until the matrix is minimized to be a matrix merely containing one point, and determining the image feature according to the matrix merely containing one point includes following steps: (a) according to one of the one or more frames of images, determining a first matrix having a first matrix dimensionality and a second matrix dimensionality. Points in the first matrix and pixels in the one or more frames of images are corresponding; values of the points in the first matrix are first vectors, and the first vectors are three-dimensional vectors, configured for indicating brightness of three color channels of a corresponding pixel; (b) disposing first blocks in the first matrix; with respect to each of the first blocks, respectively calculating a maximal value, a minimal value and an mean value of each dimensionality of the first vectors contained in the each of the first blocks to obtain a nine-dimensional second vector. Each of the first blocks contains the first vectors; the number of the first blocks on the first matrix dimensionality is smaller than the number of the points of the first matrix contained on the first matrix dimensionality, and the number of the first blocks on the second matrix dimensionality is smaller than the number of the points of the first matrix contained on the second matrix dimensionality; (c) according to the nine-dimensional second vector corresponding to the first blocks, determining a second matrix. Points in the second matrix and the first blocks are corresponding, and a value of the points in the second matrix is the nine-dimensional second vector; (d) repeating step (b) and step (c) until the first matrix is minimized to be a point whose value is a $3^N$-dimensional vector, where N is a positive integer; and determining the $3^N$-dimensional vector to be the image feature of the one or more frames of images.

In the foregoing video feature extraction method, determining a video feature according to the image feature of the one or more frames of images contains processing the image feature by binarization to obtain a binarization image feature; and according to the binarization image feature of the one or more frames of images, determining the video feature.

In the foregoing video feature extraction method, processing the image feature by binarization to obtain a binarization image feature contains following steps: generating groups according to the image feature; respectively adding up the elements in each of the groups to obtain a total number of each of the groups; pairing the groups to obtain group pairs; with respect to each of the plurality of groups, comparing total numbers of two groups in each of the group pairs, and generating a binarization image feature bit according to a comparison result; and according to binarization image feature bits of the group pairs, determining the binarization image feature of the one or more frames of images. Each of the groups includes elements in the image feature.

The object of the disclosure is also achieved by the following technical solutions. The video feature database construction method exemplified in the disclosure includes the following steps: extracting a video feature of a video object according to any one of the forgoing video feature extraction methods; and storing the video feature in a video feature database.

The object of the disclosure is also achieved by the following technical solutions. A video feature extraction device according to the disclosure includes a frame extractor configured for extracting one or more frames from a video object to obtain one or more frames of images; an image feature determiner configured for stage-by-stage processing each of the one or more frames of images by multi-typed pooling processes to obtain an image feature of the one or more frames of images; and a video feature determiner configured for determining a video feature according to the image feature of the one or more frames of images. The multi-typed pooling processes contain a maximum pooling process, a minimum pooling process and an average pooling process.

The object of the disclosure can also be further achieved by the following technical solutions.

The aforementioned video feature extraction devices further includes a module performing steps in any one of the foregoing video feature extraction methods.

The object of the disclosure is also achieved by the following technical solutions. A video feature database construction device includes a video feature extractor configured for extracting a video feature of a video object according to any one of the forgoing video feature extraction method; a video feature memory configured for storing the video feature into a video feature database; and the video feature database configured for storing the video feature database.

The object of one or more embodiments of the disclosure is also achieved by the following technical solutions. A video feature extraction hardware device according to one or more embodiments of the disclosure includes a memory configured for storing non-transitory computer readable instructions; and a processor configured for executing the non-transitory computer readable instructions such that the processor performs any one of the foregoing video feature extraction methods.

The object of one or more embodiments of the disclosure is also achieved by the following technical solutions. A computer readable storage medium according to one or more embodiments of the disclosure configured for storing non-transitory computer readable instructions, when the non-transitory computer readable instructions are executed by a computer, the computer performs any of the afore-mentioned video feature extraction methods.

The object of the disclosure is also achieved by the following technical solutions. A terminal device according to the disclosure includes any of the foregoing video feature extraction devices.

The above description is only an overview of the technical solution of the disclosure, in order to more clearly understand the technical means of the disclosure, it can be implemented in accordance with the contents of the specification, the above and other objects, features and advantages of the disclosure will become more apparent and understood, the following is a detailed description of the preferred embodiment, and with reference to the accompanying drawings.

DETAILED DESCRIPTION

To further explain the technical means and functions of the disclosure for achieving the intended inventive purpose, specific implementation modes, structures, features and functions of a video feature extraction method and device are described in detail below in conjunction with the accompanying drawings and preferred embodiments.

Figure 1:
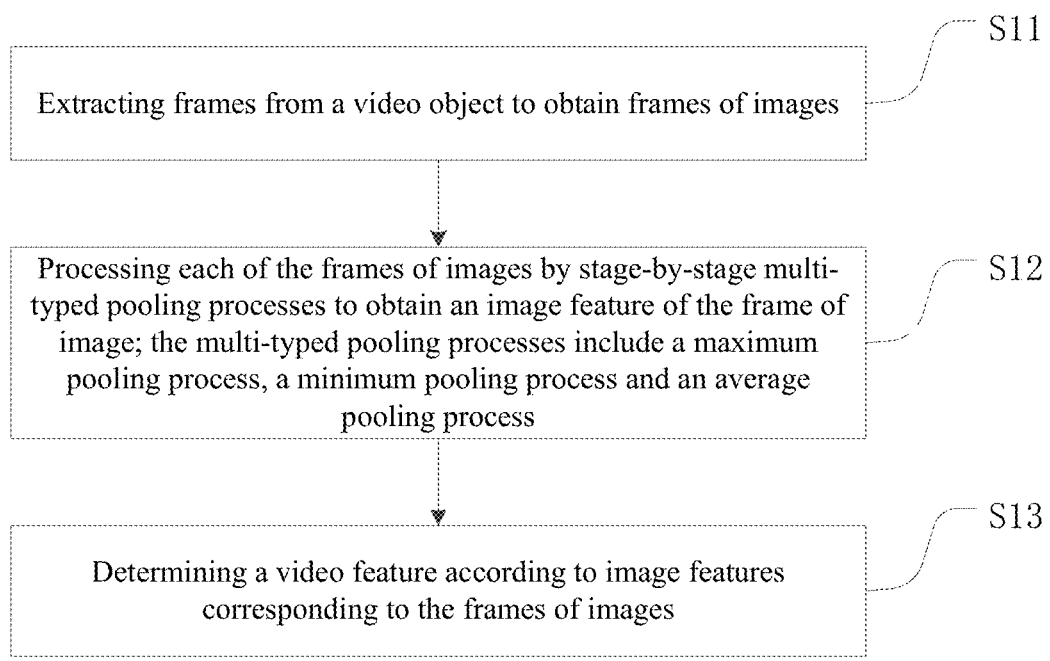
FIG. 1 is a flow block diagram of a video feature extraction method according to one or more embodiments of the disclosure.

FIG. 1 is a schematic flow block diagram of one or more embodiments of a video feature extraction method of the disclosure. Referring to FIG. 1, a video feature extraction method exemplified in one or more embodiments of the disclosure mainly includes the following steps.

Step S11, one or more frames are extracted from a video object to obtain one or more frames of images. It should be noted that the type of the video object is not limited, which may be a period of video signals, or a video file. Then, the process will be advanced to step S12.

Step S12, each of the one or more frames of images is processed by stage-by-stage multi-typed pooling processes to obtain an image feature of each of the one or more frames of images. Pooling is a dimensionality reduction method in the field of convolutional neural networks, and the multi-typed pooling processes include a maximum pooling process, a minimum pooling process and an average pooling process. Then, the process will be advanced to step S13.

Specifically, the multi-typed pooling processes may be performed stage by stage based on various color channels of the frame of image, so as to obtain the image feature according to the various color channels of the frame of image.

Step S13, a video feature of the video object is determined according to the image features corresponding to the one or more frames of images. Specifically, the image features may be combined together according to a time sequence of the frames of images to obtain the video feature.

According to the video feature extraction method provided by one or more embodiments of the disclosure, the frames of images obtained by extracting frames from video are performed stage-by-stage by multi-typed pooling processes to generate the video feature, so that the accuracy of video feature extraction and the extraction efficiency may be greatly improved, and the performance and the robustness of the obtained video feature may be increased.

In one or more embodiments of the disclosure, the step that the frame of image is processed by multi-typed pooling processes stage by stage includes that one matrix is determined according to the frame of image; a smaller matrix is generated stage by stage by using the multi-typed pooling processes till the matrix is minimized into a matrix only including one point (or the "point" in the matrix may also be known as an "element" in the matrix); and the image feature of the frame of image is determined according to the matrix only including one point.

Figure 2:
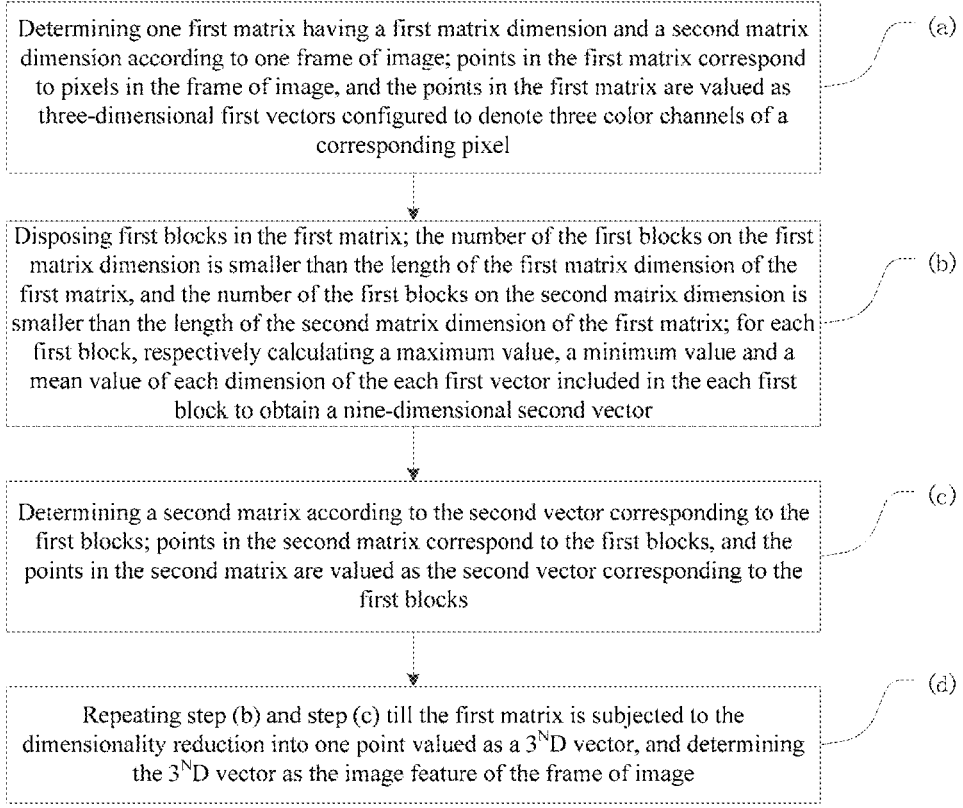
FIG. 2 is a flow block diagram of a stage-by-stage multi-typed pooling process provided by one or more embodiments of the disclosure.

FIG. 2 is a schematic flow block diagram of a stage-by-stage multi-typed pooling process of the video feature extraction method provided by one or more embodiments of the disclosure. Specifically, referring to FIG. 2, the stage by stage multi-typed pooling processes in the step S12 provided by one or more embodiments of the video feature extraction method of the disclosure include the following steps.

Step (a), one first matrix having a first matrix dimension/dimensionality and a second matrix dimension/dimensionality (or having a lengthwise direction and a width direction) is determined according to one frame of image. It can be assumed that the length of the frame of image is equal to x pixels, and the width is equal to y pixels, where x and y are positive integers. One point in the first matrix (the point in the matrix may also be known as an element in the matrix, but in order to be distinguished from an element in a vector, the element in the matrix is called "point" below) corresponds to one pixel in the frame of image, so that the first matrix is a matrix in which the first matrix dimension having a length of x and the second matrix dimension having a length of y (namely a matrix of x*y). The length of the first matrix dimension/the second matrix dimension of the matrix here is used to denote the number of points included on the first matrix dimension/the second matrix dimension of the matrix. Each point in the first matrix is valued as a three-dimensional (3D) vector which is defined as a first vector. The first vector is used to denote the brightness of three color channels of a corresponding pixel in the frame of image. It should be noted that when a color mode of the video object is a red, green and blue mode (an RGB mode), three color channels of red, green and blue may be selected, but the three color channels are unnecessary to be red, green and blue. For instance, the selection can be determined according to the color mode used by the video object, and even the number of selected color channels is not necessarily equal to three. For example, two of the three color channels of red, green and blue may be selected. Then, the process can be advanced to step (b).

Step (b), first blocks are disposed in the first matrix; actually, each block is equivalent to one pooling window, so that the first block may also be known as a first pooling window. The number of first blocks can be $x_1*y_1$, and $x_1$ and $y_1$ are positive integers. Each first block includes a number of points of the first matrix (or includes a number of first vectors). The number of the first blocks on the first matrix dimension is smaller than the length of the first matrix dimension of the first matrix (or smaller than the number of points included on the first matrix dimension of the first matrix). Furthermore, the number of the first blocks on the second matrix dimension is smaller than the length of the second matrix dimension of the first matrix (or smaller than the number of points included on the second matrix dimension of the first matrix). That is, the value of $x_1$ is less than x, and the value of $y_1$ is less than y. For each first block, a maximum value, a minimum value and a mean value in each dimension of the first vectors included in the each first block are respectively calculated to obtain a nine dimensional (9D) vector corresponding to the first blocks, and the 9D vector is defined as a second vector. It should be noted that the various first blocks may overlap each other partially, namely including the same points, or may further be apart from each other. Then, the process will be advanced to step (c).

Specifically, when the first blocks are set/disposed, the first matrix dimension of the first matrix may be uniformly divided into $x_1$ sections, each of which has the same length and two adjacent of which include the same points (partially overlap each other). According to the same way, the second matrix dimension of the first matrix is divided into $y_1$ sections. The $x_1$ sections and the $y_1$ sections are combined to obtain the $x_1*y_1$ first blocks of the first matrix.

It should be noted that when each of the set first blocks has the same size and the same spacing (two adjacent first blocks may overlap each other), the foregoing process of setting the first blocks in the first matrix and calculating the second vector of each of the first blocks is actually equivalent to scanning (or sweeping) the whole first matrix with one pooling window according to a certain spacing and calculating the second vector of a region covered by the pooling window in each scanning.

Step (c), a second matrix is determined according to the $x_1*y_1$ first blocks and the second vector corresponding to each first block. One point in the second matrix corresponds to one first block. When the number of the first blocks are disposed to be $x_1*y_1$, the second matrix is a matrix in which a first matrix dimension having a length of $x_1$ and a second matrix dimension having a length of $y_1$ (namely a matrix of $x_1*y_1$). Each of the points in the second matrix is valued as the second vector corresponding to each first block. Then, the process will be advanced to step (d).

It should be noted that during the determination of the second matrix, the first blocks need to correspond to the points in the second matrix according to a certain order. As a specific example, the points in the second matrix may be arranged according to the position order of the first blocks in the first matrix.

Step (d), step (b) and step (c) are repeated. A third matrix including $x_2*y_2$ points, each of which is valued as a 27D vector, is obtained according to the second matrix including the $x_1*y_1$ points, each of which is valued as the 9D vector ($x_2$ is a positive integer smaller than $x_1$, and $y_2$ is a positive integer smaller than $y_1$). A third matrix including $x_3*y_3$ points, each of which is valued as an 81D vector, is obtained according to the third matrix including the $x_2*y_2$ points, each of which is valued as the 27D vector ($x_3$ is a positive integer smaller than $x_2$, and $y_3$ is a positive integer smaller than $y_2$), . . . , till the first matrix (or, the frame of image) is minimized into an $N^{th}$ matrix of 1*1 (actually, the matrix is subjected to the dimensionality reduction into one point), where N is a positive integer, and the $N^{th}$ matrix includes one point only. The point is valued as a $3^N$D vector. The $3^N$D vector is determined as the image feature of the frame of image.

It should be noted that in step (d), in each process of setting the blocks, the blocks shall be set according to the size of the matrix by the corresponding method, so as to adapt to the stage-by-stage reduction of the first matrix dimension and the second matrix dimension of the matrix.

In one or more embodiments of the disclosure, the method may further include the following steps of processing the determined image feature by binarization to obtain a binarization image feature. The binarization image feature is a bit string composed of 0/1, and determining the video feature according to the obtained binarization image feature.

The image feature is processed by binarization to compress the storage of the video feature and accelerate the similarity calculation process of video comparison. In addition, the binarization process is also favor for an index database recall process of the video comparison.

Figure 3:
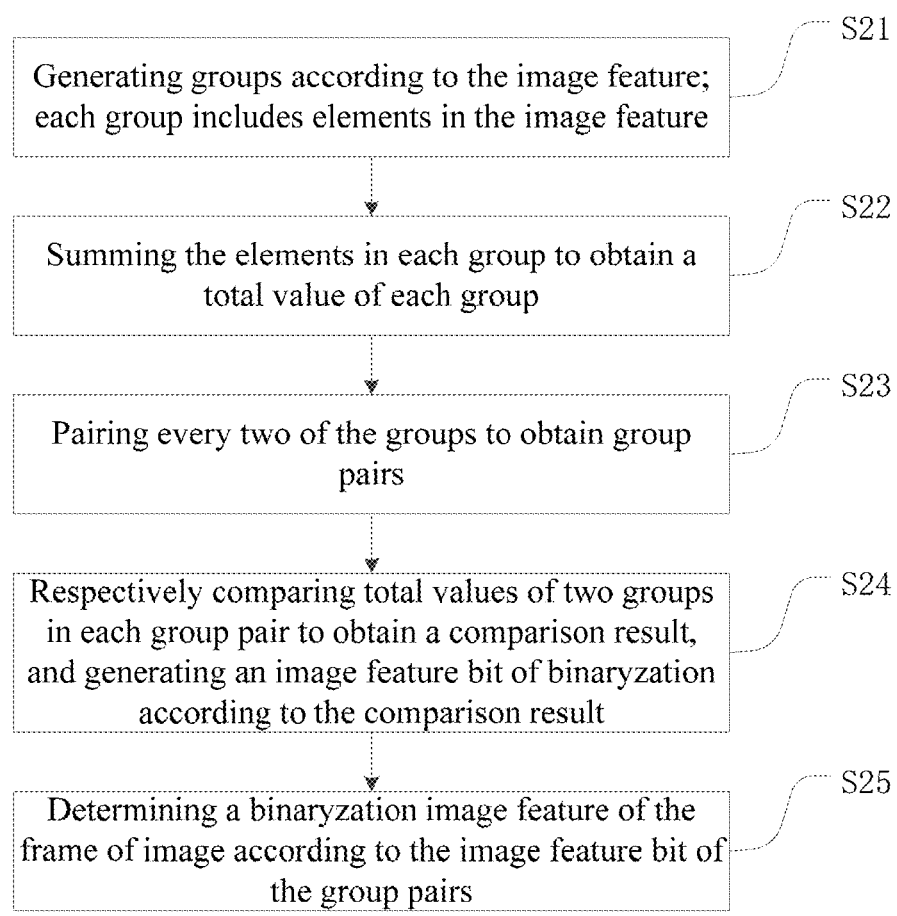
FIG. 3 is a flow block diagram of a binarization process of an image feature by using a random projection method provided by one or more embodiments of the disclosure.

Specifically, the image feature may be converted into the image feature in a binarization form by the random projection method which is particularly applicable to process the image feature in the vector form to be the image feature in the binarization form. FIG. 3 is a schematic block diagram of a binarization process of the image feature by using the random projection method of the video feature extraction method provided by one or more embodiments of the disclosure. Referring to FIG. 3, the binarization process of the image feature by using the random projection method in one or more embodiments of the disclosure mainly includes the following steps.

Step S21, in order to generate the binarization image feature whose length is n, 2n groups are generated according to the image feature, and each group includes elements in the image feature (that is, each group includes values in various dimensions of the image feature), and n is a positive integer. Then, the process will be advanced to step S22.

It should be noted that elements included in one group are random, and two different groups may include some identical elements. However, in order to facilitate the video comparison, elements included in each group can be preset/predetermined; or for a number of video objects, the group may be generated by the same method.

In this example, the number of the elements included in each group is equal. It should be noted that the number of the elements included in each of the groups may likewise be unequal.

Step S22, the elements included in each group are summed/added up to obtain a total value of each group. Then, the process will be advanced to step S23.

Step S23, every two of the 2n groups are paired to obtain n group pairs. Then, the process will be advanced to step S24.

Specifically, the 2n groups may be pre-sequenced (or the groups are numbered), and two adjacent groups are paired.

Step S24, total values of two groups in each group pair of the n group pairs are respectively compared to obtain a comparison result, and a binarization image feature bit is generated according to the comparison result. Then, the process will be advance to step S25.

Specifically, in the example that the groups have been pre-sequenced (or numbered), in one pair of groups, if the total value of the previous group is greater than that of the latter group in the sequence, a binarization image feature bit valued as 1 is generated, otherwise a binarization image feature bit valued as 0 is generated. It should be noted that the method of generating the binarization image feature bit is not limited. For example, when the total value of the previous group is less than that of the latter group, the binarization image feature bit valued as 1 is generated.

Step S25, the binarization image feature having a length of n of the frame of image is formed according to the n binarization image feature bits of the n group pairs.

Figure 4:
FIG. 4 is a schematic flow diagram of one specific example for extracting an image feature of a frame of image by using the method of one or more embodiments of the disclosure.

FIG. 4 is a schematic flow diagram of one specific process of extracting the image feature of the frame of image by using the video feature extraction method of one or more embodiments of the disclosure. Referring to FIG. 4, one specific example of extracting the image feature of the frame of image provided by one or more embodiments of the disclosure includes the following steps.

Step S31, for a frame of image of 243*243 (having a length of 243 pixels and a width of 243 pixels) obtained by extracting frames from the video object, each pixel has a red channel, a green channel and a blue channel. The red, green and blue channels are respectively marked by I, II and III in FIG. 4. A first matrix is defined according to the frame of image; each point in the first matrix corresponds to a pixel at the same position in the frame of image, and a value of the corresponding point is defined according to brightness values of the red, green and blue channels of each pixel, thereby obtaining the first matrix of 243*243. The point in the first matrix is valued as a 3D vector.

Step S32, a matrix square block of 13*13 (or this matrix square block may be known as a pooling window) is used to sweep the first matrix.

A maximum value, a minimum value and an intermediate value of each dimension (actually is the brightness of three color channels of red, green and blue) of 13*13 points covered by the matrix square block are acquired, so as to obtain a 9D vector.

Each time the matrix square block is moved 3 points towards the length direction or the width direction of the first matrix, and the matrix square block sweeps all the points in sequence in the length direction and the width direction; and the maximum value, the minimum value and the intermediate value of each dimension of the points covered by the matrix square block are calculated.

After the whole first matrix is processed, a second matrix of 81*81 is obtained. The points in the second matrix are valued as 9D vectors.

Step S33, step S32 is repeated. A matrix square block of 10*10 is used to sweep the second matrix and 3 points are swept at each time to obtain a third matrix of 27*27. The points in the third matrix are valued as 27D vectors. A matrix square block of 6*6 is used to sweep the third matrix and 2 points are swept at each time to obtain a fourth matrix of 9*9. The points in the fourth matrix are valued as 81D vectors, . . . , till a single-point matrix of 1*1 is obtained. The point included in the single-point matrix is valued as a 729D vector which is defined as a pooling vector.

Step S34, the pooling vector is processed by binarization to obtain a binarization image feature of the frame of image by using a random projection method.

Figure 5:
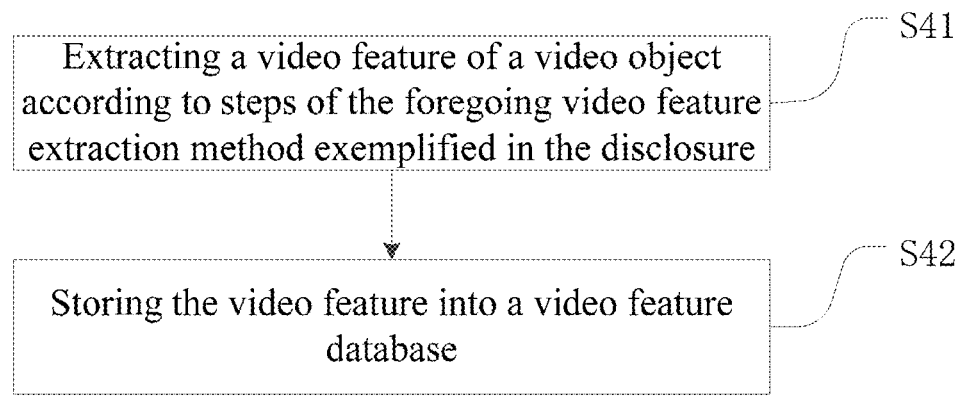
FIG. 5 is a flow block diagram of a video feature database construction method according to one or more embodiments of the disclosure.

FIG. 5 is a schematic flow diagram of one or more embodiments of a video feature database construction method of the disclosure. Referring to FIG. 5, the video feature database construction method exemplified in one or more embodiments of the disclosure mainly includes the following steps.

Step S41, a video feature of a video object is extracted according to the steps of the foregoing video feature extraction method exemplified in one or more embodiments of the disclosure. Then, the process will be advanced to step S42.

Step S42, the video feature of the video object is stored into a video feature database.

It should be noted that the video features in one video feature database should be obtained according to the same feature extraction method. That is, in the process of video feature extraction in step S41, extracting frames in step S11 should be based on the same method, and stage-by-stage processing frames of images by multi-typed pooling processes should be based on the same method in step S12, and combining the image features into the video feature should be based on the same method in step S13. In addition, as time goes on, the video feature database may be updated at any time.

Figure 6:
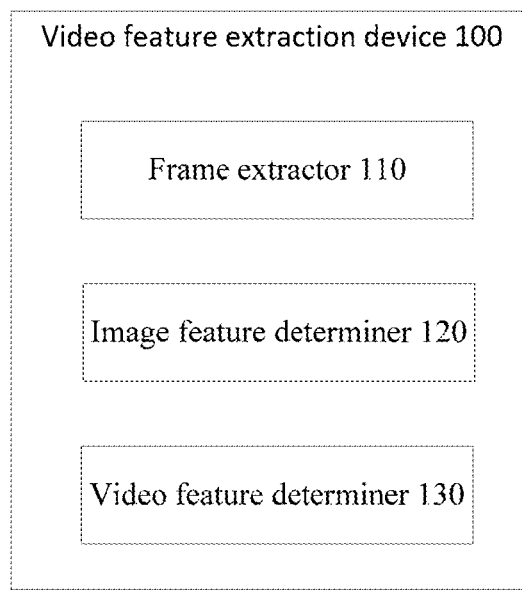
FIG. 6 is a structural block diagram of a video feature extraction device according to one or more embodiments of the disclosure.

FIG. 6 is a schematic structural block diagram of one or more embodiments of a video feature extraction device of the disclosure. Referring to FIG. 6, the video feature extraction method 100 exemplified in one or more embodiments of the disclosure mainly includes a frame extractor 110 configured for extracting one or more frames from a video object to obtain one or more frames of images, an image feature determiner 120 configured for processing each of the one or more frames of images by a stage-by-stage multi-typed pooling processes to obtain an image feature of the frame of image, and a video feature determiner 130 configured for determining a video feature according to image features corresponding to the one or more frames of images.

The multi-typed pooling processes include a maximum pooling process, a minimum pooling process and an average pooling process.

Specifically, the image feature determiner 120 is further configured for processing the frame of image by a stage-by-stage multi-typed pooling processes according to the specific step shown in one or more embodiments of the foregoing video feature extraction method of the disclosure.

Further, the video feature extraction device 100 exemplified in one or more embodiments of the disclosure further includes a binarization module (not shown in the figure), configured for processing the image feature by binarization according to the specific step shown in one or more embodiments of the foregoing video feature extraction method of the disclosure. At this time, the video feature determiner 130 is configured for determining the video feature according to image features after binzarization.

Figure 7:
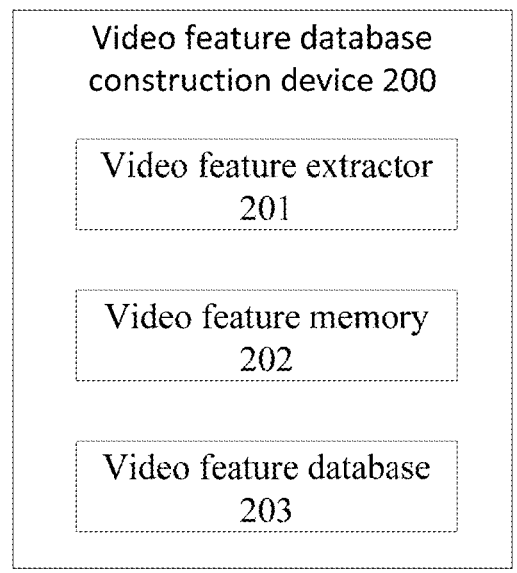
FIG. 7 is a structural block diagram of a video feature database construction device according to one or more embodiments of the disclosure.

FIG. 7 is a schematic structural diagram of one or more embodiments of a video feature database construction device of the disclosure. Referring to FIG. 7, the video feature database construction device 200 exemplified in one or more embodiments of the disclosure mainly includes a video feature extractor 201 configured for extracting video features of video objects according to the steps of the foregoing video feature extraction method of one or more embodiments of the disclosure, a video feature memory 202 configured for storing the video features into a video feature database, and the video feature database 203 configured for storing the video features of the various video objects.

The video feature extractor 201 includes the frame extractor 110, the image feature determiner 120 and the video feature determiner 130 of the foregoing video feature extraction device exemplified in one or more embodiments of the disclosure, and possibly includes a binarization module.

Figure 8:
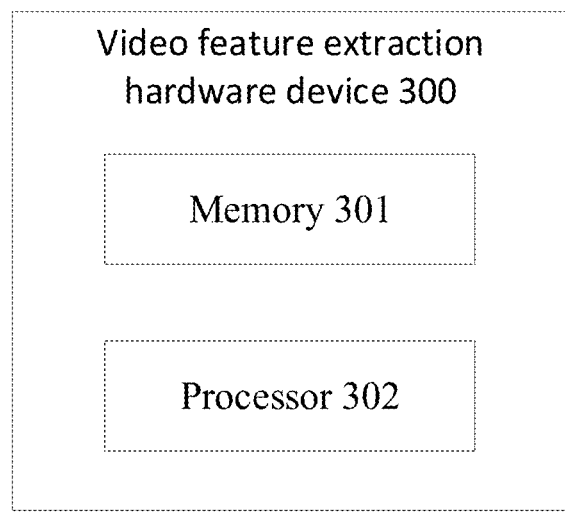
FIG. 8 is a hardware block diagram of a video feature extraction hardware device according to one or more embodiments of the disclosure.

FIG. 8 is a hardware block diagram illustrating a video feature extraction hardware device according to one or more embodiments of the disclosure. As shown in FIG. 8, a video feature extraction hardware device 300 includes a memory 301 and a processor 302. The components in video feature extraction hardware device 300 are interconnected by a bus system and/or other form of connection mechanism (not shown).

The memory 301 is configured to store non-transitory computer readable instructions. In particular, the memory 301 may include one or more computer program products that may comprise various forms of computer readable storage media such as volatile memory and/or nonvolatile memory. The volatile memory may include, for example, random access memory (RAM) and/or cache memory (cache) and the like. The nonvolatile memory may include, for example, a read-only memory (ROM), a hard disk, a flash memory, etc.

The processor 302 may be a central processing unit (CPU) or other form of processing unit with data processing capabilities and/or instruction execution capabilities, and may control the other components in the video feature extraction hardware device 300 to perform the desired functions. In one or more embodiments of the disclosure, the processor 302 is configured to run the computer readable instructions stored in the memory 301 such that the media features are all or a part of the steps of the method of the video feature extraction of one or more embodiments of the disclosure described above with respect to the hardware device 300.

Figure 9:
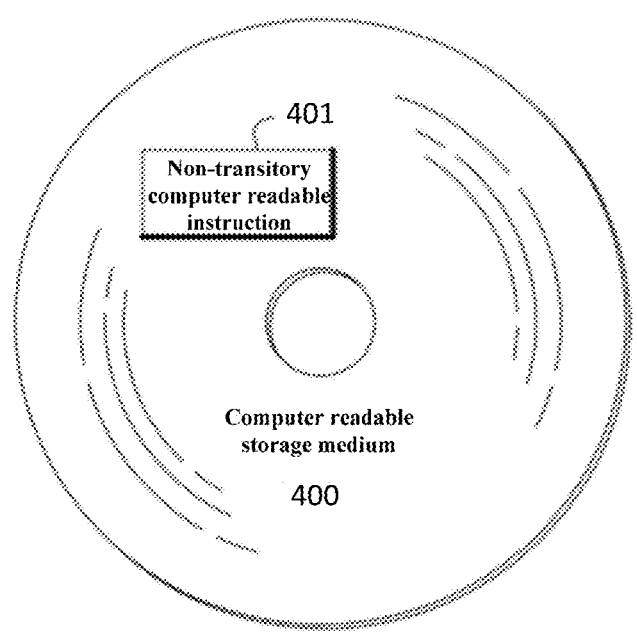
FIG. 9 is a schematic diagram of a computer readable storage medium according to one or more embodiments of the disclosure.

FIG. 9 is a schematic diagram illustrating a computer readable storage medium according to one or more embodiments of the disclosure. As shown in FIG. 9, according to the computer readable storage medium 400 according to one or more embodiments of the disclosure, a non-transitory computer readable instruction 401 is stored thereon; when the non-transitory computer readable instruction 401 is executed by a processor, all or a part of the steps of the method for the video feature extraction of one or more embodiments of the disclosure are executed.

Figure 10:
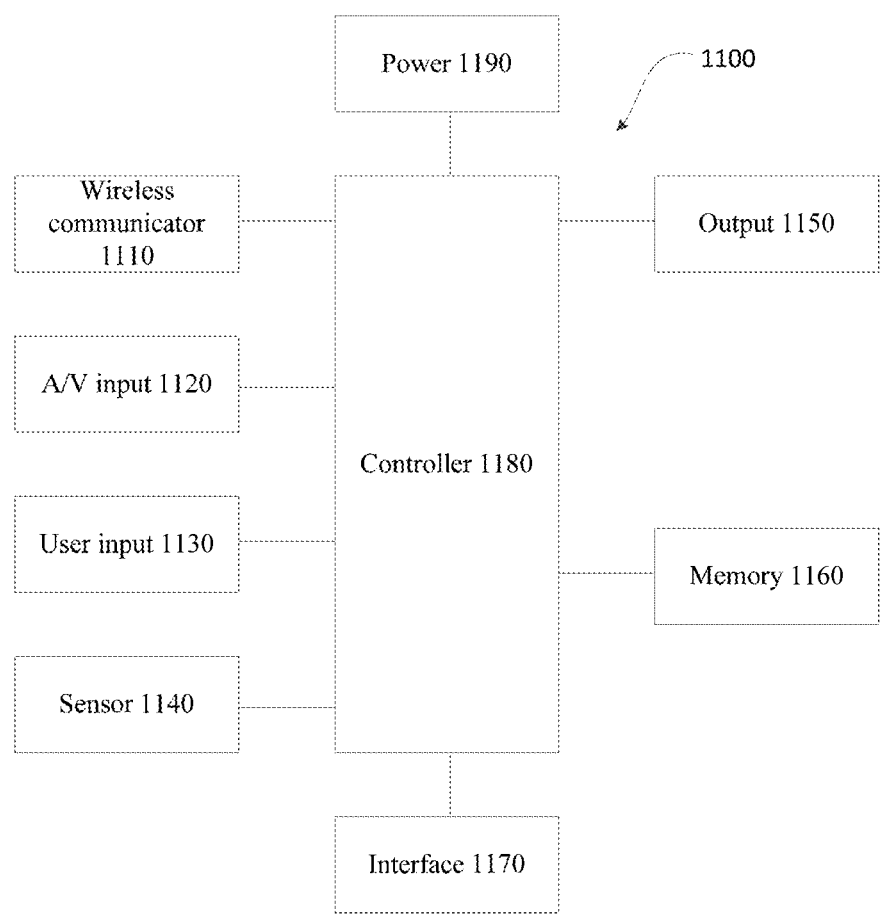
FIG. 10 is a structural block diagram of a terminal equipment according to one or more embodiments of the disclosure.

FIG. 10 is a schematic diagram illustrating a hardware structure of a terminal device according to one or more embodiments of the disclosure. A terminal device may be implemented in a variety of forms. The terminal devices in one or more embodiments of the disclosure may include, but are not limited to, mobile terminal devices such as mobile phones, smart phones, notebook computers, digital broadcast receivers, PDA (personal digital assistants), PAD (tablet computers), PMP (portable multimedia players), navigation devices, vehicle-mounted terminal devices, vehicle-mounted display terminals, vehicle-mounted electronic rearview mirrors, and the like, and fixed terminal devices such as digital TV, desktop computers, and the like.

As shown in FIG. 10, the terminal device 1100 may include a wireless communication unit 1110, an A/V (audio/video) input unit 1120, a user input unit 1130, a sensing unit 1140, an output unit 1150, a memory 1160, an interface unit 1170, a controller 1180, and a power unit 1190. FIG. 10 illustrates a terminal device with various components, but it should be understood that all illustrated components are not required to be implemented. More or fewer components may be implemented instead.

The wireless communication unit 1110 enables radio communication between the terminal device 1100 and a wireless communication system or network. The A/V input unit 1120 is configured to receive audio or video signals. The user input unit 1130 may generate key input data according to a command input by the user to control various operations of the terminal device. The sensing unit 1140 detects current state of the terminal device 1100, the position of the terminal device 1100, the orientation of the user on the touch input of the terminal device 1100, the orientation of the terminal device 1100, the acceleration or deceleration movement of the terminal device 1100, and the like, and generates a command or signal for controlling the operation of the terminal device 1100. The interface unit 1170 serves as an interface for connecting the at least one external device with the terminal device 1100. The output unit 1150 is configured to provide an output signal in a visual, audio and/or haptic manner. The memory 1160 may store software programs, such as processing and control operations, executed by the controller 1180, or may temporarily store data to be output or output to be output. The memory 1160 may include at least one type of storage medium. Moreover, the terminal device 1100 can cooperate with a network storage device that performs storage functions of the memory 1160 through a network connection. The controller 1180 typically controls the overall operation of the terminal device. In addition, the controller 1180 may include a multimedia module for reproduction or playback of multimedia data. The controller 1180 may perform pattern recognition processing to identify handwritten input or image draw inputs that are performed on the touch screen as characters or images. The power supply unit 1190 receives external power or internal power under the control of the controller 1180 and provides appropriate electrical power required to operate the elements and components.

The various embodiments of the video feature extraction method of one or more embodiments of the disclosure may be implemented using a computer readable medium such as computer software, hardware, or any combination thereof. For a hardware implementation, various embodiments of the video feature extraction method presented herein may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. The various embodiments of the video feature extraction method proposed by one or more embodiments of the disclosure can be implemented in the controller 1180. For a software implementation, various embodiments of the video feature extraction method proposed by one or more embodiments of the disclosure may be implemented with separate software modules that allow at least one function or operation to be performed. The software codes can be implemented by software applications (or programs) written in any suitable programming language, which can be stored in the memory 1160 and executed by the controller 1180.

Above, a video feature extraction method, apparatus, hardware device, computer readable storage medium, and terminal device according to one or more embodiments of the disclosure, the multi-typed pooling processes are performed stage by stage on the frames of images that are obtained by extracting frames from video to generate the video feature, so that the accuracy of video feature extraction and the extraction efficiency may be greatly improved, and the performance and the robustness of the obtained video feature may be increased. Further, the video feature obtained by the video feature extraction method of one or more embodiments of the disclosure can guarantee higher accuracy, higher efficiency, and better robustness for video comparison, video retrieval, video deduplication, and video content monitoring based thereon.

The basic principle of one or more embodiments of the disclosure is described above with reference to specific embodiments, but it should be noted that the merits, advantages, effects and the like mentioned in one or more embodiments of the disclosure are merely examples and are not intended to be limiting, and these merits, advantages, effects, and the like are not considered to be possessed by various embodiments of one or more embodiments of the disclosure. In addition, the specific details disclosed above are for illustration purposes only and are not intended to be limiting, and the details are not limited thereto.

The block diagrams of components, apparatus, devices and systems involved in one or more embodiments of the disclosure are merely illustrative examples and are not intended to require or imply that connection, arrangement, and configuration must be performed in a manner shown in a block diagram. As will be recognized by those skilled in the art, the components, apparatus, devices and systems can be connected and arranged in any manner Words such as "including", "comprising", "having", and the like are open words, refer to "including but not limited to," and may be used interchangeably. The terms "or" and "and" as used herein refer to the terms "and/or" and may be used interchangeably unless the context clearly indicates otherwise. As used herein, the term "such as" refers to the phrase "such as, but not limited to," and may be used interchangeably.

In addition, as used herein, "or" is used in the enumeration of items starting with "at least one" to indicate a separate enumeration such that, for example, the enumeration of at least one of A, B, or C means A or B or C, or AB or AC or BC, or ABC (i.e., A, B, and C). Furthermore, the term "exemplary" does not mean that the described example is preferred or better than other examples.

It should also be noted that, in the systems and methods of one or more embodiments of the disclosure, various components or steps may be decomposed and/or recombined. These decompositions and/or recombination should be considered as an equivalent scheme of the disclosure.

Various changes, substitutions and alterations of the techniques described herein may be made without departing from the teachings of the teachings defined by the appended claims. Furthermore, the scope of the claims of the disclosure is not limited to the specific aspects of the processing, machines, manufacture, events, means, methods, and acts described above. The presently existing or later-to-be-developed processes, machines, manufacture, events, compositions, means, methods, or acts may be developed that substantially the same function or achieve substantially the same result as the respective aspects described herein. Accordingly, the appended claims are intended to include within their scope such processes, machines, manufacture, compositions of matter, means, methods, or actions.

The above description of the disclosed aspects is provided to enable any person skilled in the art to make or use the disclosure. Various modifications to these aspects will be readily apparent to those skilled in the art, and the generic principles defined herein may be applied to other aspects without departing from the scope of the disclosure. Thus, the disclosure is not intended to be limited to the aspects shown herein but is to be accorded the widest scope consistent with the principles and novel features disclosed herein.

The foregoing description has been presented for purposes of illustration and description. Furthermore, this description is not intended to limit embodiments of the disclosure to the form disclosed herein. While various exemplary aspects and embodiments have been discussed above, those skilled in the art will recognize certain variations, modifications, changes, additions, and sub-combinations thereof.

What is claimed is:

1. A video feature extraction method, comprising:
extracting one or more frames from a video object to obtain one or more frames of images;
stage-by-stage processing each of the one or more frames of images by multi-typed pooling processes to obtain an image feature of the one or more frames of images, wherein the multi-typed pooling processes comprise a maximum pooling process, a minimum pooling process and an average pooling process, and wherein the stage-by-stage processing each of the one or more frames of images by multi-typed pooling processes to obtain an image feature of the one or more frames of images comprises:
  determining a matrix according to the one or more frames of images, stage-by-stage generating a smaller matrix by utilizing the multi-typed pooling processes until the matrix is minimized to be a matrix merely comprising one point, and determining the image feature according to the matrix merely comprising one point; and
determining a video feature according to the image feature of the one or more frames of images.

2. The video feature extraction method according to claim 1, wherein the stage-by-stage processing each of the one or more frames of images by multi-typed pooling processes comprises:
stage-by-stage processing each of the one or more frames of images by the multi-typed pooling processes based on a plurality of color channels of the one or more frames of images.

3. The video feature extraction method according to claim 1, wherein the determining a matrix according to the one or more frames of images, stage-by-stage generating a smaller matrix by utilizing the multi-typed pooling processes until the matrix is minimized to be a matrix merely comprising one point, and determining the image feature according to the matrix merely comprising one point comprises following steps:
(a) according to one of the one or more frames of images, determining a first matrix having a first matrix dimensionality and a second matrix dimensionality; wherein points in the first matrix and pixels in the one of the one or more frames of images are corresponding; values of the points in the first matrix are first vectors, and the first vectors are three-dimensional vectors, configured for indicating brightness of three color channels of a corresponding pixel;
(b) disposing a plurality of first blocks in the first matrix; wherein each of the plurality of first blocks comprises the first vectors; the number of the plurality of first blocks on the first matrix dimensionality is smaller than the number of the points of the first matrix comprised on the first matrix dimensionality, and the number of the plurality of first blocks on the second matrix dimensionality is smaller than the number of the points of the first matrix comprised on the second matrix dimensionality; with respect to each of the plurality of first blocks, respectively calculating a maximal value, a minimal value and an mean value of each dimensionality of the first vectors comprised in the each of the plurality of first blocks to obtain a nine-dimensional second vector;
(c) according to the nine-dimensional second vector corresponding to the plurality of first blocks, determining a second matrix; wherein points in the second matrix and the plurality of first blocks are corresponding, and a value of the points in the second matrix is the nine-dimensional second vector; and
(d) repeating step (b) and step (c) until the first matrix is minimized to be a point whose value is a 3N-dimensional vector, where N is a positive integer; and determining the 3N-dimensional vector to be the image feature of the one or more frames of images.

4. The video feature extraction method according to claim 1, wherein the determining a video feature according to the image feature of the one or more frames of images comprises:
processing the image feature by binarization to obtain a binarization image feature; and
according to the binarization image feature of the one or more frames of images, determining the video feature.

5. The video feature extraction method according to claim 4, wherein the processing the image feature by binarization to obtain a binarization image feature comprises following steps:
generating a plurality of groups according to the image feature; wherein each of the plurality of groups comprises a plurality of elements in the image feature;
respectively adding up the plurality of elements in each of the plurality of groups to obtain a total number of each of the plurality of groups;
pairing the plurality of groups to obtain a plurality of group pairs;
with respect to each of the plurality of groups, comparing total numbers of two groups in each of the plurality of group pairs, and generating a binarization image feature bit according to a comparison result; and
according to binarization image feature bits of the plurality of group pairs, determining the binarization image feature of the one or more frames of images.

6. A video feature extraction device, comprising:
a memory, configured for storing non-transitory computer readable instructions; and
a processor, configured for executing the non-transitory computer readable instructions such that the processor causes the device to:
extract one or more frames from a video object to obtain one or more frames of images;
stage-by-stage process each of the one or more frames of images by multi-typed pooling processes to obtain an image feature of the one or more frames of images, wherein the multi-typed pooling processes comprise a maximum pooling process, a minimum pooling process and an average pooling process, and wherein stage-by-stage processing each of the one or more frames of images by multi-typed pooling processes to obtain an image feature of the one or more frames of images comprises:
  determining a matrix according to the one or more frames of images, stage-by-stage generating a smaller matrix by utilizing the multi-typed pooling processes until the matrix is minimized to be a matrix merely comprising one point, and determining the image feature according to the matrix merely comprising one point; and
determine a video feature according to the image feature of the one or more frames of images.

7. A non-transitory computer readable storage medium, configured for storing non-transitory computer readable instructions, when the non-transitory computer readable instructions are executed by a computer, causing the computer to perform operations of:

extracting one or more frames from a video object to obtain one or more frames of images;

stage-by-stage processing each of the one or more frames of images by multi-typed pooling processes to obtain an image feature of the one or more frames of images, wherein the multi-typed pooling processes comprise a maximum pooling process, a minimum pooling process and an average pooling process, and wherein the stage-by-stage processing each of the one or more frames of images by multi-typed pooling processes to obtain an image feature of the one or more frames of images comprises:

determining a matrix according to the one or more frames of images, stage-by-stage generating a smaller matrix by utilizing the multi-typed pooling processes until the matrix is minimized to be a matrix merely comprising one point, and determining the image feature according to the matrix merely comprising one point; and determining a video feature according to the image feature of the one or more frames of images.

8. The video feature extraction device according to claim 6, wherein the stage-by-stage processing each of the one or more frames of images by multi-typed pooling processes comprises:

stage-by-stage processing each of the one or more frames of images by the multi-typed pooling processes based on a plurality of color channels of the one or more frames of images.

9. The video feature extraction device according to claim 6, wherein the determining a matrix according to the one or more frames of images, stage-by-stage generating a smaller matrix by utilizing the multi-typed pooling processes until the matrix is minimized to be a matrix merely comprising one point, and determining the image feature according to the matrix merely comprising one point comprises following steps:

(a) according to one of the one or more frames of images, determining a first matrix having a first matrix dimensionality and a second matrix dimensionality; wherein points in the first matrix and pixels in the one of the one or more frames of images are corresponding; values of the points in the first matrix are first vectors, and the first vectors are three-dimensional vectors, configured for indicating brightness of three color channels of a corresponding pixel;

(b) disposing a plurality of first blocks in the first matrix; wherein each of the plurality of first blocks comprises the first vectors; the number of the plurality of first blocks on the first matrix dimensionality is smaller than the number of the points of the first matrix comprised on the first matrix dimensionality, and the number of the plurality of first blocks on the second matrix dimensionality is smaller than the number of the points of the first matrix comprised on the second matrix dimensionality; with respect to each of the plurality of first blocks respectively calculating a maximal value, a minimal value and an mean value of each dimensionality of the first vectors comprised in the each of the plurality of first blocks to obtain a nine-dimensional second vector;

(c) according to the nine-dimensional second vector corresponding to the plurality of first blocks, determining a second matrix; wherein points in the second matrix and the plurality of first blocks are corresponding, and a value of the points in the second matrix is the nine-dimensional second vector; and (d) repeating step (b) and step (c) until the first matrix is minimized to be a point whose value is a $3^N$-dimensional vector, where N is a positive integer; and determining the $3^N$-dimensional vector to be the image feature of the one or more frames of images.

10. The video feature extraction device according to claim 6, wherein the determining a video feature according to the image feature of the one or more frames of images comprises:

processing the image feature by binarization to obtain a binarization image feature; and according to the binarization image feature of the one or more frames of images, determining the video feature.

11. The video feature extraction device according to claim 10, wherein the processing the image feature by binarization to obtain a binarization image feature comprises following steps:

generating a plurality of groups according to the image feature; wherein each of the plurality of groups comprises a plurality of elements in the image feature;

respectively adding up the plurality of elements in each of the plurality of groups to obtain a total number of each of the plurality of groups;

pairing the plurality of groups to obtain a plurality of group pairs;

with respect to each of the plurality of groups, comparing total numbers of two groups in each of the plurality of group pairs, and generating a binarization image feature bit according to a comparison result; and according to binarization image feature bits of the plurality of group pairs, determining the binarization image feature of the one or more frames of images.

12. The non-transitory computer readable storage medium according to claim 7, wherein the stage-by-stage processing each of the one or more frames of images by multi-typed pooling processes comprises:

stage-by-stage processing each of the one or more frames of images by the multi-typed pooling processes based on a plurality of color channels of the one or more frames of images.

13. The non-transitory computer readable storage medium according to claim 7, wherein the determining a matrix according to the one or more frames of images, stage-by-stage generating a smaller matrix by utilizing the multi-typed pooling processes until the matrix is minimized to be a matrix merely comprising one point, and determining the image feature according to the matrix merely comprising one point comprises following steps:

(a) according to one of the one or more frames of images, determining a first matrix having a first matrix dimensionality and a second matrix dimensionality; wherein points in the first matrix and pixels in the one of the one or more frames of images are corresponding; values of the points in the first matrix are first vectors, and the first vectors are three-dimensional vectors, configured for indicating brightness of three color channels of a corresponding pixel;

(b) disposing a plurality of first blocks in the first matrix; wherein each of the plurality of first blocks comprises the first vectors; the number of the plurality of first blocks on the first matrix dimensionality is smaller than the number of the points of the first matrix comprised on the first matrix dimensionality, and the number of the plurality of first blocks on the second matrix dimensionality is smaller than the number of the points of the first matrix comprised on the second matrix dimensionality; with respect to each of the plurality of first blocks, respectively calculating a maximal value, a minimal value and an mean value of each dimensionality of the first vectors comprised in the each of the plurality of first blocks to obtain a nine-dimensional second vector;

(c) according to the nine-dimensional second vector corresponding to the plurality of first blocks, determining a second matrix; wherein points in the second matrix and the plurality of first blocks are corresponding, and a value of the points in the second matrix is the nine-dimensional second vector; and (d) repeating step (b) and step (c) until the first matrix is minimized to be a point whose value is a 3N-dimensional vector, where N is a positive integer; and determining the 3N-dimensional vector to be the image feature of the one or more frames of images.

14. The non-transitory computer readable storage medium according to claim 7, wherein the determining a video feature according to the image feature of the one or more frames of images comprises:

processing the image feature by binarization to obtain a binarization image feature; and according to the binarization image feature of the one or more frames of images, determining the video feature.

15. The non-transitory computer readable storage medium according to claim 14, wherein the processing the image feature by binarization to obtain a binarization image feature comprises following steps:

generating a plurality of groups according to the image feature; wherein each of the plurality of groups comprises a plurality of elements in the image feature;

respectively adding up the plurality of elements in each of the plurality of groups to obtain a total number of each of the plurality of groups;

pairing the plurality of groups to obtain a plurality of group pairs;

with respect to each of the plurality of groups, comparing total numbers of two groups in each of the plurality of group pairs, and generating a binarization image feature bit according to a comparison result; and according to binarization image feature bits of the plurality of group pairs, determining the binarization image feature of the one or more frames of images.

* * * * *